United States Patent
Edwards

[15] 3,670,574
[45] June 20, 1972

[54] FORCE GAGING GLOVES
[72] Inventor: William R. Edwards, California, Md.
[73] Assignee: The United States of America as represented by the Secretary of the Navy
[22] Filed: April 7, 1971
[21] Appl. No.: 132,035

[52] U.S. Cl. .............................73/379 R, 73/141 A, 2/160
[51] Int. Cl. .........................................................G01l 5/22
[58] Field of Search...............73/133, 141 R, 379 R, 172; 116/114 G; 2/160

[56] References Cited

UNITED STATES PATENTS

| | | |
|---|---|---|
| 2,383,554 | 8/1945 | Krickler....................................73/133 |
| 2,582,234 | 1/1952 | Conzelman, Jr. et al..............73/379 R |
| 2,680,967 | 6/1954 | Newman..............................73/379 R |
| 2,708,367 | 5/1955 | Lusk....................................73/379 R |
| 3,374,762 | 3/1968 | Baldwin..............................73/379 X |

Primary Examiner—Charles A. Ruehl
Attorney—R. S. Sciascia and Thomas O. Watson, Jr.

[57] ABSTRACT

A glove for indicating pressure either positive or negative, as may be applied to the stick of helicopter. A number of interconnected flexible cells located in the palm and along the fingers of the glove are connected by transparent tubing which runs along the back of the hand. The cells and tubing are liquid filled, and a small nylon ball in the tubing moves as pressure is applied to the cells.

6 Claims, 2 Drawing Figures

PATENTED JUN 20 1972 3,670,574

INVENTOR.
WILLIAM R. EDWARDS
BY Thomas O. Watson Jr.

ATTORNEY

FORCE GAGING GLOVES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a pressure indicating device and more particularly to a device adapted to indicate pulling or pushing pressure.

Teaching new helicopter pilots the art of hovering, i.e. maintaining the helicopter in a stationary position in flight, has, at times, been difficult and time consuming task. Originally, the primary method for teaching pilots to hover was by trial and error with many hours of practice necessary for a new pilot to learn the correct pressure to be applied to maintain the helicopter in a stationary position. This difficulty resulted in the development of devices to indicate the proper pressure to be applied to the helicopter stick in order to maintain the craft in a hovering position. The disadvantage of these devices is that they are cumbersome and complicated. These devices are designed to be attached to the helicopter stick and by a series of levers provide an indication of positive and negative pressure with an indicating dial.

There are also devices available which contain a pressure chamber filled with a fluid which give an indication of pressure. These devices are primarily designed to be used with a prosthetic device to give an indication of proper finger pressure. One such device has a small pressure chamber in the thumb of a prosthetic hand and gives an indication in a ring on the finger of the hand of the amount of pressure being applied. These devices are mainly directed to giving an indication of grasping pressure and do not indicate positive or negative pressure in the forward or rearward direction. A device such as that described for indicating finger pressure is disclosed in U.S Pat. No. 3,374,762.

SUMMARY OF THE INVENTION

The purpose of the present invention is to provide a device that is easy to construct, inexpensive and is easily and quickly put in to use.

The device is a glove, worn by the pilot and used to grasp the control stick of the helicopter. The glove has a fluid pressure chamber on the fingers of the glove and another pressure chamber at the base of the thumb on the palm of the glove. These two pressure chambers are connected by a transparent flexible tube with runs from one pressure chamber across the back of the glove to the other pressure chamber. A small nylon ball movable within the transparent tubing indicates a positive or a negative pressure.

OBJECTS OF THE INVENTION

It is an object of the present invention to provide a pressure indicating device which is easily and quickly put into use.

It is a further object of the present invention to provide a pressure indicating device which is both lightweight and easy to use.

Still another object of the present invention is to provide a device which can be used to train helicopter pilots.

Still a further object of the device is to provide a pressure indicator for training pilots which gives a visual indication of a positive or negative pressure.

Other objects, advantages and novel features of the invention will become apparent from the following detailed description of the invention when considered in conjunction with the accompanying drawings.

DETAILED DESCRIPTION OF THE PREFERRED EMBODIMENT

Figure 1:
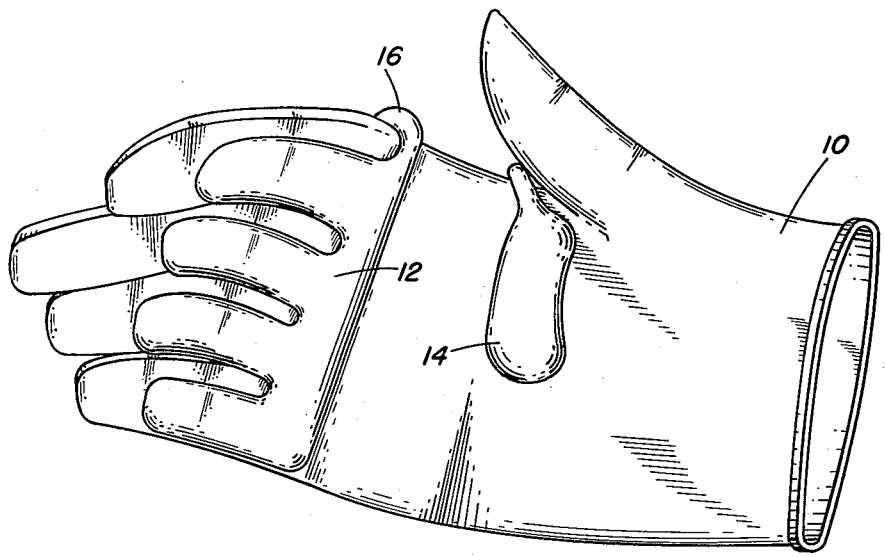
FIG. 1 illustrates the glove with flexible cells along the fingers and a flexible cell underneath the thumb.
Figure 2:
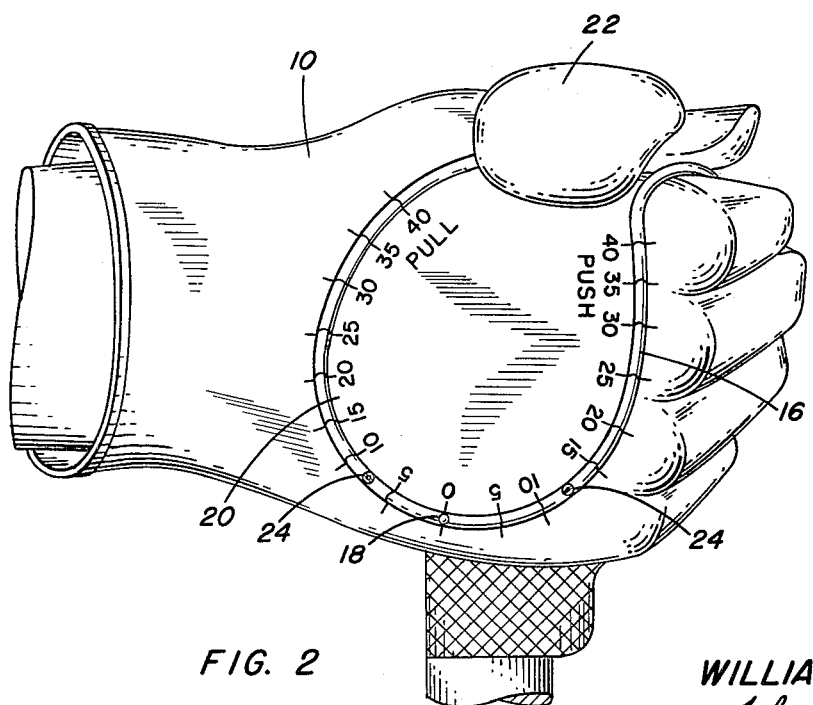
FIG. 2 shows the glove on a hand grasping a helicopter stick and illustrates the clear plastic tubing calibrated to indicate the positive and negative pressure.

Referring now to FIG. 1 there is shown the fingers and palm of the glove 10. Attached to the fingers of the glove are flexible pressure cells 12 which extend from the point approximately where the first nuckle of the finger would be to the palm of the glove. The flexible pressure cells 12 are all connected together where the fingers join the palm of the glove. Another flexible cell 14 is attached to the heel of the glove and extends around the thumb to the crevice between the thumb and the back of the hand. Flexible transparent tubing 16 made from a non-extensible material, connects flexible cell 12 to flexible cell 14. The flexible transparent tubing extends across the back of the glove as shown in FIG. 2 to form a semicircle. The flexible cells 12 and 14 and the transparent tubing 16 are filled with a suitable liquid to provide a constant volume.

Referring now to FIG. 2 transparent tubing 16 contains a nylon ball 18 which has approximately the same diameter as the tubing. Calibrations, as shown at 20 are provided to indicate the amount of travel of nylon ball 18 which will produce an equivalent pushing or pulling pressure.

To utilize the invention the glove is worn on the hand while grasping an object such as a helicopter stick as shown at 22. The nylon ball 18 is zeroed by working it back and forth. A pushing force will move the nylon ball 18 to the right while a pulling force will tend to force the nylon ball to the left. The pilot being trained is thus provided with a visual indication of the amount of pushing and pulling pressure necessary to maintain the helicopter in a hovering position.

If desired highest force indicators could be provided as shown at 24. These would give an indication to the pilot of the range within which to keep the nylon ball 18 in order to maintain the helicopter in a hovering position. One way to do this would be to provide cross-drilled ferrite balls which tightly fit inside the transparent tubing 16. By making the ferrite balls tightly fit the transparent tubing and providing cross-drilled holes through them, they will remain stationary at the last position to which they are pushed by the nylon ball. The holes through the ferrite ball permits the liquid to flow through it when pressure is applied in the opposite direction. The use of ferrite for the highest force indicators permits adjusting them with a magnet. Alternatively an adjustable indicator could be provided on the outside of transparent tubing 16. Once the maximum pushing and pulling pressure necessary to maintain the helicopter in a hovering position is determined the adjustable indicators could be set.

Numerous variations in the construction and materials for use in the device are possible. The glove 10 can be made from rubber or leather or any other suitable durable material and the flexible cells 12 and 14 can either be attached to the external portion of the glove or could be made integral with the glove. Glycerin was found to be a suitable liquid for the flexible cells and its viscosity can be varied by the addition of alcohol. In the preferred embodiment Tygon tubing was used however any flexible tubing which meets the requirement that it be subject to a minimum amount of stretching would be suitable.

Thus there has been disclosed a unique apparatus which provides an indication of positive or negative pressure, is simple in construction, and is easy to use. Obviously many modifications and variations of the present invention are possible in the light of the above teachings.

What is claimed is:

1. A device for indicating a pushing or pulling pressure comprising:
   a glove;
   a first flexible pressure cell attached to the fingers of the glove;

a second flexible pressure cell attached to the glove at the thumb; said first and second pressure cells being filled with a liquid; and means connecting the first pressure cell with the second pressure cell, said means adapted to indicate a pushing or pulling pressure.

2. The device of claim 1 wherein the connecting means is a transparent tubing containing a nylon ball.

3. The device of claim 2 wherein the connecting means is calibrated to indicate equivalent pushing and pulling pressure.

4. The device of claim 3 further including means for indicating the highest pushing or pulling force which has been applied.

5. The device of claim 4 wherein the means for indicating the highest force is a cross drilled ferrite ball on either side of the nylon ball.

6. The device of claim 5 wherein the liquid is glycerin.

* * * * *